(12) United States Patent
Jansen et al.

(10) Patent No.: US 10,789,689 B2
(45) Date of Patent: Sep. 29, 2020

(54) METHOD AND APPARATUS FOR CORRECTION OF AN IMAGE

(71) Applicant: SPEKTRAL EXPERIENCE APS, Copenhagen K (DK)

(72) Inventors: Toke Jansen, Holte (DK); Jacob Schack Vestergaard, København (DK)

(73) Assignee: ALTOSTRATUS CAPITAL LLC, Wilmington, DE (US)

( * ) Notice: Subject to any disclaimer, the term of this patent is extended or adjusted under 35 U.S.C. 154(b) by 175 days.

(21) Appl. No.: 15/759,771

(22) PCT Filed: Sep. 26, 2016

(86) PCT No.: PCT/EP2016/072812
§ 371 (c)(1),
(2) Date: Mar. 13, 2018

(87) PCT Pub. No.: WO2017/055204
PCT Pub. Date: Apr. 6, 2017

(65) Prior Publication Data
US 2019/0050972 A1 Feb. 14, 2019

(30) Foreign Application Priority Data
Sep. 29, 2015 (EP) ..................... 15187328

(51) Int. Cl.
*G06T 5/20* (2006.01)
*G06T 5/00* (2006.01)
(Continued)

(52) U.S. Cl.
CPC ............... *G06T 5/20* (2013.01); *G06T 5/008* (2013.01); *G06T 5/50* (2013.01); *G06T 7/11* (2017.01);
(Continued)

(58) Field of Classification Search
CPC .......... H04N 9/75; H04N 5/272; H04N 5/275; G06T 5/00; G06T 5/005; G06T 5/008;
(Continued)

(56) References Cited

U.S. PATENT DOCUMENTS

| 6,553,140 B1 | 4/2003 | Soupliotis et al. |
| 8,175,384 B1 * | 5/2012 | Wang ...................... G06T 7/194 348/586 |

(Continued)

OTHER PUBLICATIONS

Levin, A., D. Lischinski, and Y. Weiss. "A Closed Form Solution to Natural Image Matting." 2006 IEEE Computer Society Conference on Computer Vision and Pattern Recognition (CVPR'06). vol. 1. IEEE, 2006. (Year: 2006).*

(Continued)

*Primary Examiner* — Geoffrey E Summers
(74) *Attorney, Agent, or Firm* — Fernando & Partners, LLP

(57) ABSTRACT

Disclosed is an apparatus comprising a processing device and a method for color correction of an image in a processing device, the method comprising: obtaining an image; determining a Laplacian matrix of the image; obtaining a first region of the image, the first region being indicative of a part of the image to be color corrected; obtaining a second region of the image; obtaining a first recoloring image based on the second region; determining a first corrected region of a first corrected image based on the Laplacian matrix and the first recoloring image; and obtaining and outputting a corrected image based on the first corrected region of the first corrected image.

22 Claims, 11 Drawing Sheets

(51) Int. Cl.
*G06T 7/11* (2017.01)
*G06T 5/50* (2006.01)

(52) U.S. Cl.
CPC ............... *G06T 2207/10024* (2013.01); *G06T 2207/20072* (2013.01); *G06T 2207/20104* (2013.01)

(58) Field of Classification Search
CPC .... G06T 5/20; G06T 5/50; G06T 7/10; G06T 7/11; G06T 7/194; G06T 2207/20104; G06T 2207/20072; G06T 2207/10024
USPC ................................. 382/254, 274, 275, 173
See application file for complete search history.

(56) References Cited

U.S. PATENT DOCUMENTS

| | | | |
|---|---|---|---|
| 2007/0165966 A1* | 7/2007 | Weiss ..................... | H04N 5/272 382/284 |
| 2010/0061628 A1* | 3/2010 | Yamada ................... | G06T 7/11 382/167 |

OTHER PUBLICATIONS

Levin et al. "A Closed-Form Solution to Natural Image Matting," IEEE Transactions of Pattern Analysis and Machine Intelligence, IEEE Computer Society, USA, vol. 30, No. 2, Feb. 1, 2008.
Written Opinion and International Search Report for corresponding PCT/EP2016/072812 dated Dec. 12, 2016.

* cited by examiner

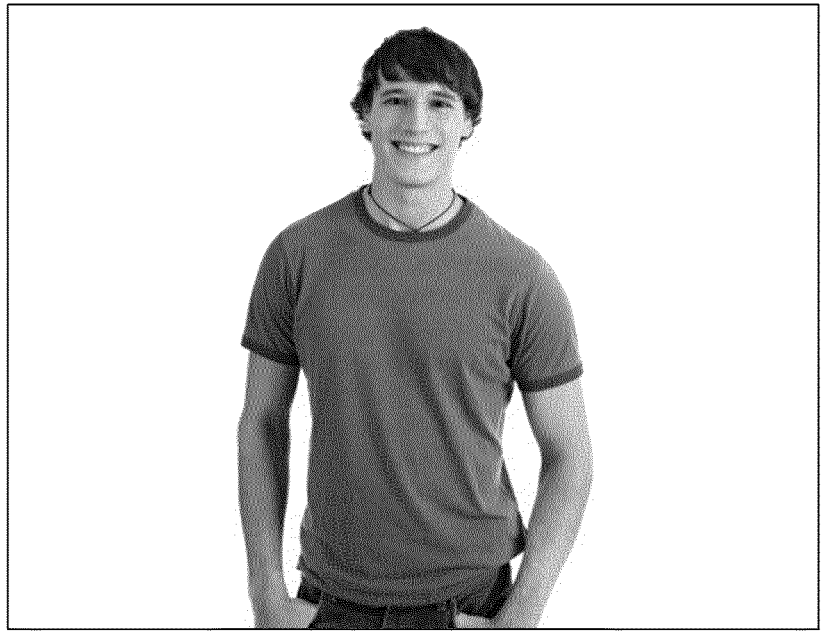
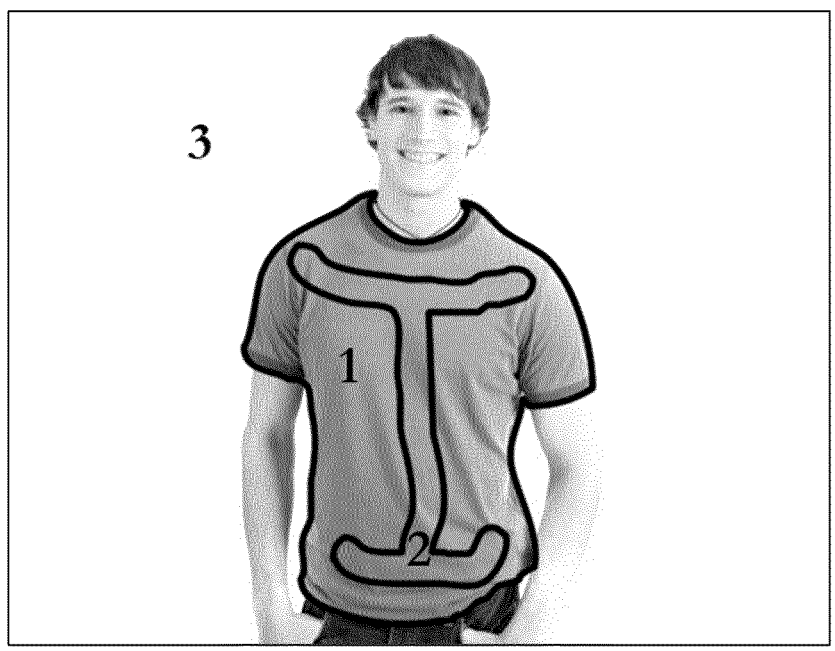
Fig. 2a)

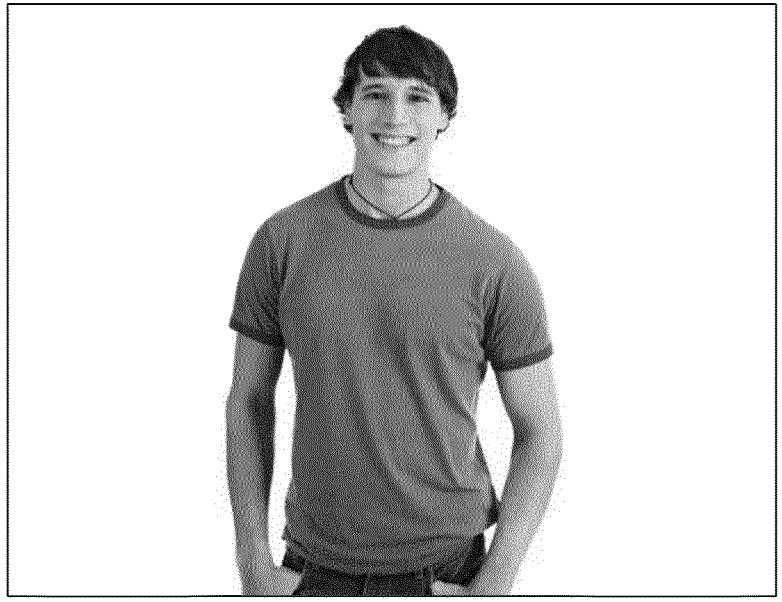
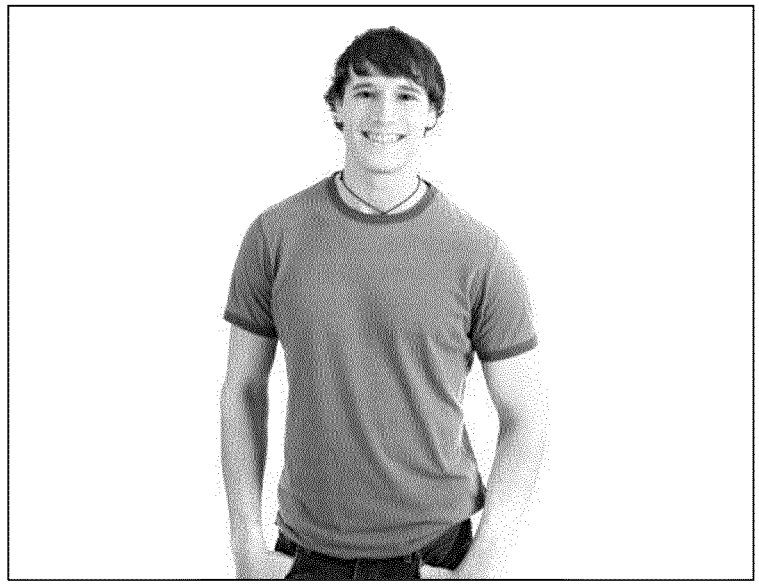
Fig. 2b)

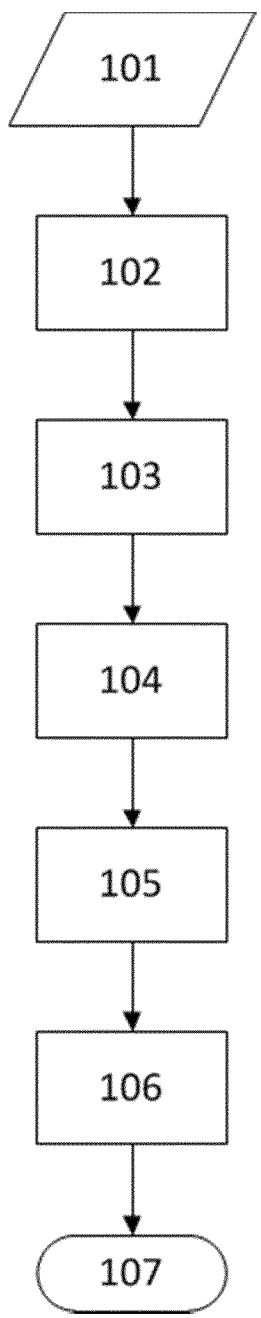
Fig. 3)

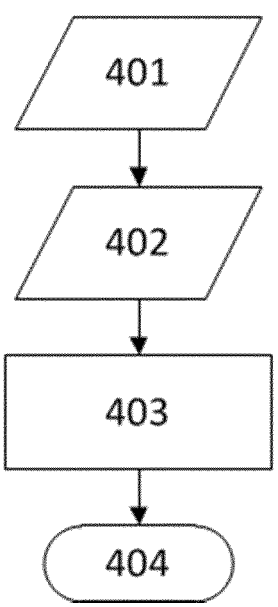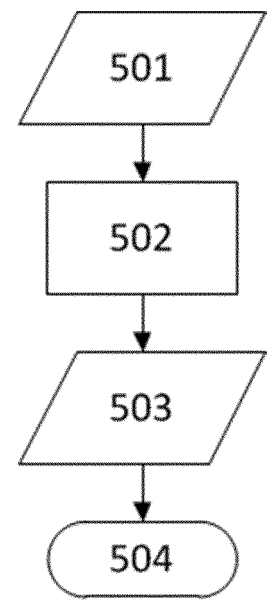
Fig. 6
Fig. 7

METHOD AND APPARATUS FOR CORRECTION OF AN IMAGE

BACKGROUND

A well-established procedure in studio photography is to photograph a subject in front of a background which is easily separable from the foreground. This background is typically blue or green, wherefore it is known as blue-screen or green-screen photography. This setup enables automated subsequent removal of the background using so-called chroma keying, which is why it is largely considered the industry standard. However, a side-effect of this procedure is light spilling from the background onto the subject, which results in miscoloration of the final image.

Various procedures, known as "spill correction" have been suggested to alleviate this problem, confer for example U.S. Pat. Nos. 6,553,140, 7,280,117, 7,692,664, 8,081,821, and CN 101764913.

However these methods do not provide images corrected to a satisfactory degree.

SUMMARY

Accordingly, there is a need for provision of improved apparatus and methods to reduce light spilling in color correction of images.

Disclosed is a method for correction, such as color correction, of an image in a processing device. The method comprises obtaining an image. The method comprises determining a representation, such as a Laplacian matrix, of the image. The method comprises obtaining a first region of the image. The first region may be indicative of a part of the image to be corrected. The method comprises obtaining a second region of the image. The method comprises obtaining a first recoloring image based on the second region. The method comprises determining a first corrected region of a first corrected image, e.g. based on the Laplacian matrix and/or the first recoloring image. The method comprises obtaining and/or outputting a corrected image based on the first corrected region of the first corrected image.

Also disclosed is an apparatus for color correction of an image. The apparatus comprises a processing device. The processing device is configured for obtaining an image. The processing device is configured for determining a Laplacian matrix of the image. The processing device is configured for obtaining a first region of the image. The first region may be indicative of a part of the image to be (color) corrected. The processing device is configured for obtaining a second region of the image. The processing device is configured for obtaining a first recoloring image based on the second region. The processing device is configured for determining a first corrected image of the first region. The first corrected image may be based on the Laplacian matrix. The first corrected image may be based on the first recoloring image. The processing device is configured for obtaining a corrected image based on the first corrected image. The processing device is configured for outputting the corrected image.

The present disclosure provides a solution to the problem of light spilling from the background of an image onto a subject of the image, since the method and apparatus are able to remove the color spill and recover the true color to a much higher degree. The present disclosure provides efficient and high quality cutout of subjects of an image.

It is an advantage that the method and apparatus can be used in a high-throughput, quality-demanding setting of producing automated cutouts of images.

It is an advantage that the method and apparatus can save time in producing cutouts of images. Further, it is an advantage of the method that it can save processing power of the apparatus.

Using a representation, such as a Laplacian matrix, of the image has the advantage that a smoothness representation of the image is provided. The smoothness representation can be used for relating pixels to other pixels, and thus used to determine and decide on color corrections in the image.

It is an advantage that the quality achieved using a very rich representation encapsulated in a Laplacian matrix can be much more visually pleasing than existing methods. Further, the method can be used for unsupervised or automatic color correction of images, where other tools are manually supervised or user-driven.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 3 schematically illustrates an exemplary flow chart illustrating steps of the present method.

FIG. 6 schematically illustrates an exemplary flow chart illustrating steps of the present Jo method.

FIG. 7 schematically illustrates an exemplary flow chart illustrating steps of the present method.

DETAILED DESCRIPTION

Figure 1A:
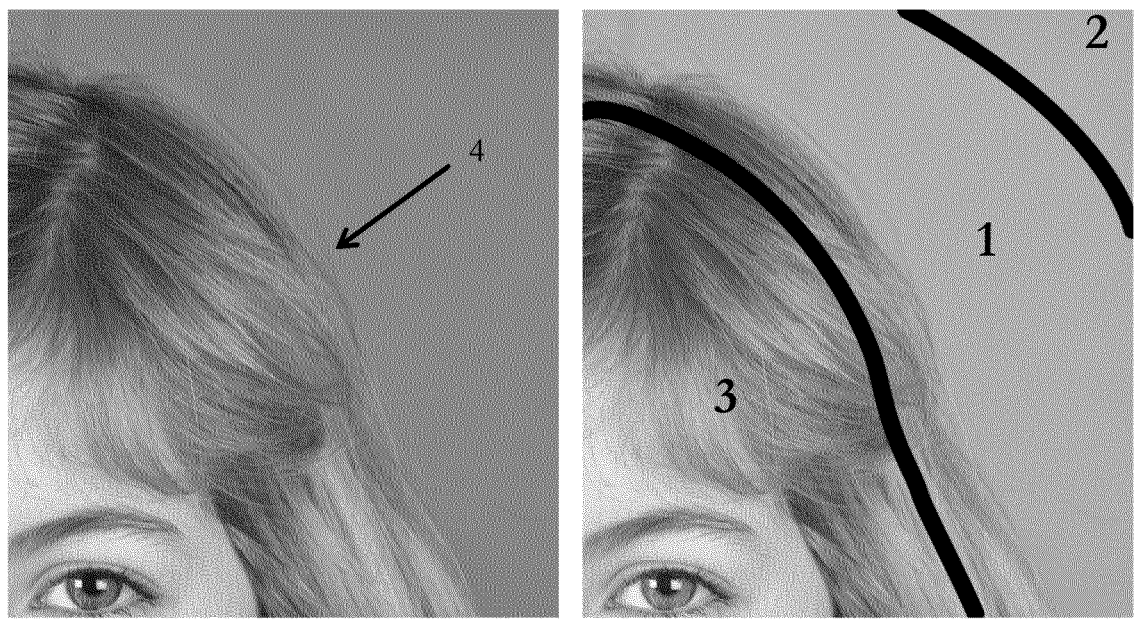
FIG. 1 schematically illustrates exemplary images illustrating the color correction or color change in an image obtained by the present method.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

The method comprises obtaining an image. The image may be a whole image or a part of a basic image. Obtaining the image may comprise cutting and/or cropping a part of a basic image. Obtaining the image may comprise retrieving the image, e.g. from a memory unit and/or via the Internet. Obtaining the image may comprise retrieving a basic image and deriving the image from the basic image. Obtaining the image may comprise changing an image format of a basic image to a different image format and use the formatted basic image as the image. For example, obtaining the image may comprise changing an image format, e.g. CMYK, of a basic image to a desired image format, such as RGB.

The image may be a single-frame image and/or a still image and/or a two-dimensional (2D) image. The image may be a photo of a subject such as a person, thus the image may be a portrait or a portrait photo. The image may be a three-dimensional (3D) image, such as a stream of 3D image data, and/or film images or video images or video sequences or frames. The image may be a satellite image. The image may comprise one or a plurality of sub-images, such as a first image, a second image, a third image, etc., wherein each sub-image is representative of a color channel of the image. The image may be an RGB color image. The image may be a CMYK color image.

The image may comprise a first image. The first image may correspond to a color channel of the image. The first image may correspond to the red color channel of an RGB color image. The first image may correspond to the cyan color channel of a CMYK color image. The first image may correspond to a first channel of a satellite image.

The image may comprise a second image. The second image may correspond to a color channel of the image. The second image may correspond to the green color channel of an RGB color image. The second image may correspond to the magenta color channel of a CMYK color image. The second image may correspond to a second channel of a satellite image.

The image may comprise a third image. The third image may correspond to a color channel of the image. The third image may correspond to the blue color channel of an RGB color image. The third image may correspond to the yellow color channel of a CMYK color image. The third image may correspond to a third channel of a satellite image.

The image may comprise a fourth image. The fourth image may correspond to a color channel of the image. The fourth image may correspond to the key color channel (black) of a CMYK color image. The fourth image may correspond to a fourth channel of a satellite image.

The method comprises determining and/or obtaining a representation, such as a smoothness representation, of the image. The representation may be indicative of image smoothness of the image or at least parts thereof. The representation may be a Laplacian matrix of the image. The Laplacian matrix may be a matting Laplacian matrix.

A smoothness representation of the image provides a model of how colors at one pixel relate to other pixels in the image, for instance in terms of how similar the pixels are. A Laplacian matrix may be the preferred way to represent this information. Having a Laplacian matrix representing the image facilitates propagation of colors from one part of an image to another.

The Laplacian matrix is a matrix representation of a graph. The edge weights of the graph represent the connection strength of the connected nodes. A Laplacian matrix representation of an image is a matrix representation of pixel-to-pixel similarities. The smoothness of an image can thus be represented with a Laplacian matrix of the image.

Determining a Laplacian matrix of the image may comprise determining a matting Laplacian matrix of the image, e.g. wherein the matting Laplacian matrix is given by:

$$L_{ij} = \sum_{k|(i,j)\in w_k} \left( \delta_{ij} - \frac{1}{|w_k|}\left(1 + (I_i - \mu_k)^T \left(\sum_k + \frac{\varepsilon}{|w_k|}I_3\right)^{-1}(I_j - \mu_k)\right)\right) \quad (1)$$

where subscript ij refers to the ij'th element of the matrix, $\delta_{i,j}$ is the Kronecker delta, k is the k'th window with a total of $|w_k|$, covariance matrix $\Sigma_k$ and mean vector $\mu_k$. Here $I_i$ is a vector of color channel values, such as RGB values, of the i'th pixel and $I_3$ is the 3×3 identity matrix. Here $I_j$ is a vector of color channel values, such as RGB values, of the j'th pixel.

The method comprises obtaining a first region of the image. The first region may be indicative of a part of the image to be (color) corrected. The first region may comprise one or a plurality of sub-regions, e.g. including a first primary region and/or a first secondary region. The first region may have a wrong or undesired color or the first region may comprise sub-regions or pixels having a wrong or undesired color. The first region may be termed an unknown region as the desired color of pixels of the first region is yet unknown. The first region may be denoted an unknown region, or uncertain or incorrectly colored region of the image. The first region may be the region that is supposed to be corrected, such as color corrected or filled in with a correct color etc. The first region may include the border region or edge region between a desired part/subject in the image and a second region. The second region may be a background part of the image. The first region may be the region comprising the area or sub-region of pixels which have an undesired appearance in the image, e.g. due to light spilling from a second region, e.g. background part, onto the subject. The effect of light spilling from the background onto the subject may result in the subject's hair being miscolored, such as the subject's hair comprising green tones, e.g. at the border or edge between the subject and the background.

Thus it is an advantage of the present disclosure that light spill from a background into a subject may be substantially reduced or compensated for.

Obtaining the first region may comprise receiving user input indicative of the first region. The first region may be obtained by receiving user input manually by a user, such as the user drawing or marking the first region on the image, such as on a computer screen using computer software graphic tools.

The first region may be determined automatically or at least semi-automatically based on for example chroma keying or other techniques. Obtaining the first region may comprise determining a first region of the image based on the image, e.g. based on an alpha matte of the image. The alpha matte can then be used to determine the first region, for instance by comparing alpha values of a pixel with threshold values. Alpha is a value indicating the opacity of each pixel which may be in the range from 0 to 1, with 0 being completely transparent and 1 being completely opaque. For example, pixels of the image with an alpha value within a certain range, such as from 0.10 to 0.90 may be regarded as part of the first region.

Thus the first region to be recolored or corrected can be determined in various ways, e.g. by an automatic region identifier and/or by user input. Automatic region identification may comprise using chroma keying given a key color or pixel classification, e.g. using texture information and/or using a mathematical model. The user in this context may be the person initiating, controlling or operating the image processing, such as the photographer, an assistant to the photographer, an operator in a company performing image processing etc.

A region of the image, e.g. the first region and/or the second region, comprises a plurality of pixels, such as a subset of pixels of the image. A sub-region of a region comprises a plurality of pixels, such as a subset of pixels of the region.

The method comprises obtaining a second region of the image. The second region may be at least a part of the background in the image, such as a blue-screen or green-screen from a photo studio.

After specifying or determining first region above, a mathematical model may be defined or selected or applied for determining colors in the first region for example by using the information from the second region.

Obtaining the second region may comprise receiving user input indicative of the second region. The second region may be obtained by receiving user input manually by a user, such as the user drawing or marking the second region on the image, such as on a computer screen using computer software graphic tools.

The second region may be determined automatically or at least semi-automatically based on for example chroma keing or other techniques. Obtaining the second region may comprise determining a second region of the image based on the image, e.g. based on an alpha matte of the image and/or the first region of the image. The alpha matte can then be used to determine the second region, for instance by comparing alpha values of pixels with threshold values. For example, pixels of the image with an alpha value larger than a threshold value, such as larger than 0.9, may be regarded as part of the second region. For example, pixels of the image with an alpha value less than a threshold value, such as less than 0.1, may be regarded as part of the second region. Thus the second region can be determined in various ways, e.g. by an automatic region identifier and/or by user input. Automatic region identification may comprise using chroma keying given a key color or pixel classification, e.g. using texture information. The user in this context may be the person initiating, controlling or operating the image processing, such as the photographer, an assistant to the photographer, an operator in a company performing image processing etc.

The method may comprise obtaining a third region. A third region of the image may be determined. The third region may be the foreground or a subset of the foreground of the image, such as the subject or part of the subject.

The first region may be or include the edge or border or region or area between the second region and the third region.

The first region and the second region may be disjoint regions. The first region and the second region may be adjacent regions. The first region and the second region may be overlapping regions. The second region may be surrounded by the first region.

The first region and the third region may be disjoint regions. The first region and the third region may be adjacent regions. The first region and the third region may be overlapping regions. The first region may be surrounded by the third region.

The second region and the third region may be disjoint regions. The second region and the third region may be adjacent regions. The second region and the third region may be overlapping regions. The second region may be surrounded by the third region.

Obtaining the third region may comprise receiving user input indicative of the third region. The third region may be obtained by receiving user input manually by a user, such as the user drawing or marking the third region on the image, such as on a Jo computer screen using computer software graphic tools.

The third region may be determined automatically or at least semi-automatically based on for example chroma keing or other techniques. Obtaining the third region may comprise determining a third region of the image based on the image, e.g. based on an alpha matte of the image, the first region of the image and/or the second region of the image. The alpha matte can then be used to determine the third region, for instance by comparing alpha values of pixels with threshold values. For example, pixels of the image with an alpha value larger than a threshold value, such as larger than 0.9, may be regarded as part of the third region. For example, pixels of the image with an alpha value less than a threshold value, such as less than 0.1, may be regarded as part of the third region. Thus the third region can be determined in various ways, e.g. by an automatic region identifier and/or by user input. Automatic region identification may comprise using chroma keying given a key color or pixel classification, e.g. using texture information. The user in this context may be the person initiating, controlling or operating the image processing, such as the photographer, an assistant to the photographer, an operator in a company performing image processing etc.

The method comprises obtaining one or more recoloring images based on the second region.

The method may comprise obtaining a first recoloring image based on the second region. The first recoloring image may correspond to a color channel. The first recoloring image may correspond to the red color channel of an RGB color image. The first recoloring image may correspond to the cyan color channel of a CMYK color image.

The method comprises determining a first corrected region of a first corrected image based on the representation of the image, e.g. Laplacian matrix, and/or the first recoloring image.

The method may comprise obtaining a second recoloring image based on the second region. The second recoloring image may correspond to a color channel. The second recoloring image may correspond to the green color channel of an RGB color image. The second recoloring image may correspond to the magenta color channel in a CMYK color representation.

The method may comprise determining a first corrected region of a second corrected image based on the representation of the image, e.g. Laplacian matrix, and/or the second recoloring image.

The method may comprise obtaining a third recoloring image based on the second region. The third recoloring image may correspond to a color channel. The third recoloring image may correspond to the blue color channel of an RGB color image. The third recoloring image may correspond to the yellow color channel of a CMYK color image.

The method may comprise determining a first corrected region of a third corrected image based on the representation of the image, e.g. Laplacian matrix, and/or the third recoloring image.

The method may comprise obtaining a fourth recoloring image based on the second region. The fourth recoloring image may correspond to a color channel. The fourth recoloring image may correspond to the key color channel (black) of a CMYK color image.

The method comprises obtaining and outputting a corrected image based on the first corrected image. The corrected image may be based on the second corrected image and/or the third corrected image. The corrected image may be based on the fourth corrected image The first corrected image may be or correspond to a first color channel, e.g. a color channel of an RGB color image or a color channel of a CMYK color image. The first corrected image may correspond to the red color channel of an RGB color image. The first corrected image may correspond to the cyan color channel of a CMYK color image.

The second corrected image may be or correspond to a second color channel, e.g. a color channel of an RGB color image or a color channel of a CMYK color image. The second corrected image may correspond to a color channel. The second corrected image may correspond to the green color channel of an RGB color image. The second corrected image may correspond to the magenta color channel in a CMYK color representation.

The third corrected image may be or correspond to a third color channel, e.g. a color channel of an RGB color image or a color channel of a CMYK color image. The third corrected image may correspond to the blue color channel of an RGB color image. The third corrected image may correspond to the yellow color channel of a CMYK color image.

The first corrected image may be a grey-scale image. In this case further corrected images corresponding to color channels may be omitted.

Obtaining a recoloring image based on the second region of the image may comprise selecting and setting the color of a second recoloring region of one or more recoloring images. The pixels of the second recoloring region of the recoloring images may correspond to the pixels of the second region of the image.

For example, obtaining a recoloring image, such as the first, second, and/or third recoloring image, may comprise identifying a second recoloring region of the respective recoloring image. The second recoloring region of the recoloring image may correspond to the second region of the respective image. For example, the second recoloring region of the first recoloring image may correspond to the second region of the first image. For example, the second recoloring region of the second recoloring image may correspond to the second region of the second image. For example, the second recoloring region of the third recoloring image may correspond to the second region of the third image. Subsequently the color settings of the second recoloring regions of the respective recoloring images (first, second and third recoloring image) are determined and applied to the second recoloring regions of the respective recoloring images.

The first, second, third and/or fourth recoloring images may be obtained by specifying, adjusting, determining and/or exchanging colors or color settings in the second region of the first, second, third and/or fourth images, respectively. The colors of the second region, e.g. the background, of the image may for example be green if the background of the image is a green-screen from a photo studio. A color which the second region is specified, adjusted, determined and/or exchanged to be (i.e., color settings of second recoloring regions) may for example correspond to parts of the subject where light spill occurs. For example, the color of the second recoloring regions of recoloring image(s) may correspond to brown, if the subject's hair, where light spill typically occurs, is brown.

Thus the color of the first region, e.g. the region comprising areas or pixels to be color corrected, can be corrected by specifying, adjusting, determining and/or exchanging the colors on a different region of the image, such as the colors in the second recoloring region of a recoloring image.

The representation of the image, such as the Laplacian matrix, may provide and/or ensure that the information, e.g. in terms of color dependency and/or pixel dependency, from the second region, e.g. the background of the image, is transferred to the first region, e.g. the region of the image to be color corrected.

First corrected region(s) of corrected image(s) may be determined based on the Laplacian matrix and/or corresponding recoloring image(s), because it is an advantage that the Laplacian matrix may ensure a smoothening of the colors and the first recoloring image may ensure a desired color. The smoothening may be a visually pleasing smoothening of the colors.

The method comprises obtaining a corrected image. The corrected image may be based on first corrected region(s) of the corrected image(s). The corrected image may be based on the first corrected region of the first corrected image. The corrected image may be based on the first corrected image. The corrected image may be the final image delivered to the client, customer etc. or the corrected image may be further processed. The corrected image may be an intermediate corrected image and further processed by for example repeating the method with another first and second region. Obtaining a corrected image may comprise obtaining a mask representative of an alpha matte of the image, wherein the corrected image is based on the mask.

The method comprises outputting the corrected image. Outputting the corrected image may comprise storing and/or sending and/or transmitting the image. The corrected image may be stored on a memory unit and/or sent to and/or transmitted to a display, such as computer screen, a graphical user interface etc.

The image may be stored in a remote storage, such as a cloud storage. The cloud storage may be connected to a cloud service. The image may be stored and/or retrieved via the cloud service in and/or from the cloud storage.

The image may be stored in a local storage, such as in database or folder on the user's computer or image processing device.

The image may be stored permanently and/or temporarily in the remote and/or local storage. The stored image may be encrypted or not.

The order of the steps of the method can be in the order as mentioned above or in any other order. For example after obtaining the image, the first region may be obtained before the Laplacian matrix is determined. For example after obtaining the image, the second region may be obtained before obtaining the first region. Thus for example the order of the second step, the third step and the fourth step may be in any order.

The constraints to the problem can be specified in different ways, e.g. based on colors in the image, and/or based on some other measure of the image, and/or specified via user input.

It is not necessarily the full Laplacian matrix or the full pixel graph of the Laplacian that should be used, such as the full matting Laplacian matrix. For example a part, a portion, a subset etc. of the full pixel graph can be used to form the Laplacian matrix. For example it may be a low rank approximation that is used. For example the first N eigenvectors may be used sorted ascendingly according to eigenvalue, where N may be in the range from 1 to the number of pixels in the image.

The corrected image(s) or color channels of the corrected image, for example red, green and blue (RGB) channels, may be found by solving the three systems of linear equations, as in Eq. (2) below. Alternatively and/or additionally they can be found by matrix multiplication on an inverted matrix. Alternatively and/or additionally they can be found by an approximation. The approximation may be found by an optimization algorithm.

The Laplacian matrix, such as the matting Laplacian matrix, specified here can be some other representation of the pixel similarity. The Laplacian matrix specifically mentioned here is however particularly good.

Recoloring Via Matting Laplacian

Consider the RGB image $I \in \mathbb{R}^{m \times n \times 3}$, with color channel vectors $R, G, B \in \mathbb{R}^{mn}$, and the mask $M \in \{0,1\}^{m \times n}$ defining unknown and known regions as 0 and 1 respectively.

The matting Laplacian is derived from an RGB color model and describes the similarity between neighboring pixels. The matting Laplacian may be defined by $L \in \mathbb{R}^{mn \times mn}$ having the (i,j)'th element $$L_{ij} = \sum_{k|(i,j) \in w_k} \left( \delta_{ij} - \frac{1}{|w_k|} \left( 1 + (I_i - \mu_k)^T \left( \sum_k + \frac{\varepsilon}{|w_k|} I_3 \right)^{-1} (I_j - \mu_k) \right) \right)$$

where subscript ij refers to the ij'th element of the matrix, $\delta_{ij}$ is the Kronecker delta, k is the k'th window with a total of $|w_k|$ pixels, covariance matrix $\Sigma_k$ and mean vector $\mu_k$. Here $I_i$ is a vector of RGB values of the i'th pixel and $I_3$ is the 3×3 identity matrix.

The steps which may be performed for recoloring with the matting Laplacian may be to first compute the matting Laplacian for the entire image I. Next, the recolored $\hat{R}, \hat{G}$ and $\hat{B}$ values may be determined by solving the three systems of linear equations:

$(L+\lambda T)\hat{R}=\lambda R^{re}$ $(L+\lambda T)\hat{G}=\lambda G^{re}$ $(L+\lambda T)\hat{B}=\lambda B^{re}$ (2)

where $\lambda$ is a regularization parameter and $T \in \{0,1\}^{mn \times mn}$=diag(M) is a diagonal matrix holding the constraints. M is a binary mask with same spatial dimensions as the image, with the value 1 in the second and third regions and 0 in the first region, i.e., where the color is to be determined. The three vectors $R_{re}, G_{re}, B_{re} \in \mathbb{R}^{mn}$ compose the so-called recoloring image. The recoloring image can be specified in a number of ways; one way, which is useful for spill correction in hair, is to set everything in the background region to the estimated (or specified) hair color and keep the foreground colors fixed.

The final color corrected image $\hat{I}$ is assembled with the three corrected vectors $\hat{R}, \hat{G}$ and $\hat{B}$ as color channels.

Abstraction Over Color Channels

Alternatively the recoloring step can be written without reference to the explicit color channels R, G and B. Instead, they can be referred to as $x_i$, $i \in \{1, \ldots, K\}$ with K being the number of channels to be corrected. Thus, we may obtain $x_i^{re}$ as the recoloring image for the i'th channel and the i'th corrected image can be found as the solution to the linear equation:

$(L+\lambda T)\hat{x}_i=\lambda x_i^{re} \ \forall i \in \{1, \ldots, K\}$. (3)

This encapsulates the equations in Eq 2, but also covers a case with more than three color channels, or even just a single color channel.

After having determined the K corrected images, the final corrected may be obtained by combining these to a single image.

Alternative Laplacians

The matting Laplacian specified above is one of many possible Laplacians for an image. A Laplacian can be specified by specifying the elements of the adjacency matrix A, since L=D−A, where D is the diagonal degree matrix with $D_{ii} = \sum_{j=1}^{mn} A_{ij}$.

Two examples of such alternative adjacency matrices are:

$$A_{ij} = e^{-\gamma I_i^T I_j} \quad (4)$$

$$A_{ij} = 1 - \frac{\|I_i - I_j\|}{C} \quad (5)$$

where Eq. 4 is known as the Gaussian kernel with scale parameter $\gamma \in \mathbb{R}_+$. In Eq. 5 $C \in \mathbb{R}_+$ is a normalizing constant to ensure that $A_{ij} \in [0,1]$.

These two adjacency matrices implicitly specify two alternative Laplacian matrices.

In an exemplary method at least one of the corrected images is based on the first region.

This may be represented by the term T in the eq (2) below, i.e., in the expression L+λT. The correct or desired color in the first region may remain unchanged. The color of the second region, e.g. the background color, may be set to for example the hair color of the subject in the image.

In an exemplary method obtaining a first recoloring image based on the second region comprises adjusting a second recoloring region of the first recoloring image based on the second region.

The second recoloring region may be the background in the recoloring image. The second recoloring region may be a part or a portion or a subset of the second region.

The color of the second region, e.g. background color, may be set to the hair color of the subject on the image. Adjusting the second recoloring region may comprise adjusting the color of one or more pixels of the second recoloring region. Adjusting the second recoloring region may comprise specifying or confirming the second recoloring region.

In an exemplary method obtaining a first recoloring image based on the second region comprises obtaining one or more region parameters of the second recoloring region.

The region parameters may be the color or the size of the region. The region parameters may be which pixels to be color corrected.

Obtaining the region parameters may comprise determining the region parameters based on user input. Obtaining the region parameters may comprise performing image analysis of the image, such as the input image or basic image or original image. Image analysis may comprise color analysis, edge detection, layer analysis, e.g. determining foreground and/or background of the image etc.

In an exemplary method obtaining a first recoloring image based on the second region comprises setting a color of the second recoloring region to a color different from the color of the second region of the image.

Thus the color of the second recoloring region may be set to a color different from the background color of the image.

In an exemplary method obtaining a second recoloring image based on the second region comprises setting a color of the second recoloring region to a color different from the color of the second region of the image.

In an exemplary method obtaining a third recoloring image based on the second region comprises setting a color of the second recoloring region to a color different from the color of the second region of the image.

In an exemplary method determining a Laplacian matrix of the image comprises determining a matting Laplacian matrix of the image, the matting Laplacian matrix given by:

$$L_{ij} = \sum_{k|(i,j) \in w_k} \left( \delta_{ij} - \frac{1}{|w_k|} \left( 1 + (I_i - \mu_k)^T \left( \sum_k + \frac{\varepsilon}{|w_k|} I_3 \right)^{-1} (I_j - \mu_k) \right) \right) \quad (6)$$

where subscript ij refers to the ij'th element of the matrix, $\delta_{i,j}$ is the Kronecker delta, k is the k'th window with a total of $|w_k|$, covariance matrix $\Sigma_k$ and mean vector $\mu_k$. Here $I_i$ is a vector of RGB values of the i'th pixel and $I_3$ is the 3×3 identity matrix.

For an RGB image we obtain the recoloring image $R^{re}$ (first recoloring image) for the red channel, the recoloring image $G^{re}$ (second recoloring image) for the green channel and the recoloring image $B^{re}$ (third recoloring image) for the blue channel. The respective corrected images $\hat{R}$ (first corrected image), $\hat{G}$ (second corrected image) and $\hat{B}$ (third corrected image) are found as solutions to the linear equations:

$$(L+\lambda T)\hat{R} = \lambda R^{re}$$

$$(L+\lambda T)\hat{G} = \lambda G^{re}$$

$$(L+\lambda T)\hat{B} = \lambda B^{re} \quad (7)$$

where $\lambda$ is a regularization parameter.

For an image with an arbitrary number of K channels, e.g. color channels, we obtain the recoloring image $x_i^{re}$ as the recoloring image for the i'th channel and the i'th corrected image $\hat{x}_i$ can be found as the solution to the linear equation:

$$(L+\lambda T)\hat{x}_i = \lambda x_i^{re} \quad \forall i \in \{1, \ldots, K\}. \quad (8)$$

In an exemplary method the method comprises obtaining a third region of the image. The method may comprise that the first recoloring image is based on the third region.

The third region may be the foreground or a subset of the foreground of the image. The third region may be a region having the correct or desired colors. The third region may be a region which is not changed or not supposed to be changed, such as color corrected etc. The third region, such as the foreground of the image, may be the shirt or clothes of the subject or person in the image. The colors of the shirt or clothes may have correct or desired colors.

In an exemplary method the first recoloring image comprises the third region of the image.

Thus the third region may be the foreground, which should not be changed, as the colors of the foreground may be correct or desired.

In an exemplary method the method comprises obtaining a mask representative of an alpha matte of the image. The corrected image may be based on the mask.

Thus the mask may be applied to the image as a step of the processing of the image, such as a final step of the processing of the image. The determination of the first region, e.g. the border or edge, of the image and/or the second region, e.g. the background, and/or the third region, e.g. the foreground, in the corrected image may be based on the mask.

The alpha matte may represent transparency in the image. Alpha compositing is the process of combining an image with a background to create the appearance of partial or full transparency. It may be useful to render image elements in separate passes, and then combine the resulting multiple 2D images into a single, final image called the composite. In order to combine these image elements correctly, an associated matte for each element may be kept. This matte contains the coverage information, i.e., the shape of the geometry being drawn, making it possible to distinguish between parts of the image where the geometry was actually drawn and other parts of the image that are empty.

FIG. 1 and FIG. 2 show images or photos illustrating the color correction or color change in the image or photo obtained by the present method.

FIG. 1 schematically illustrates an example of reducing or removing light spilling in color correction of images. In FIG. 1 green spill from the background in a subject's hair is removed by using the present method. The left image in FIG. 1a) is a part of an original image of a subject. The background is green. It is seen, in the color version of the figures, that some of the subject's hair looks green, in particular the single hair strands (4) that sticks out from the rest of the hair.

The right image in FIG. 1a) is the original image shown in grey scale where three regions are indicated. The first region, marked 1, is the region of the image where light from the background is spilling onto the subject, and where the colors should be corrected. The second region, marked 2, is the background of the image, in this case the screen in the photo studio, such as a green screen, where the colors will be replaced with those of the correction image. The third region, marked 3, is a subset of the foreground of the image, in this case the subject's face, where the colors are assumed to be correct in the image In FIG. 1b) the top left image shows the original, not corrected image, in red, green, and blue (RGB) color channels. From this image, the green spill from the background into the subject's hair 4 in the first region is very clear.

Figure 1B:
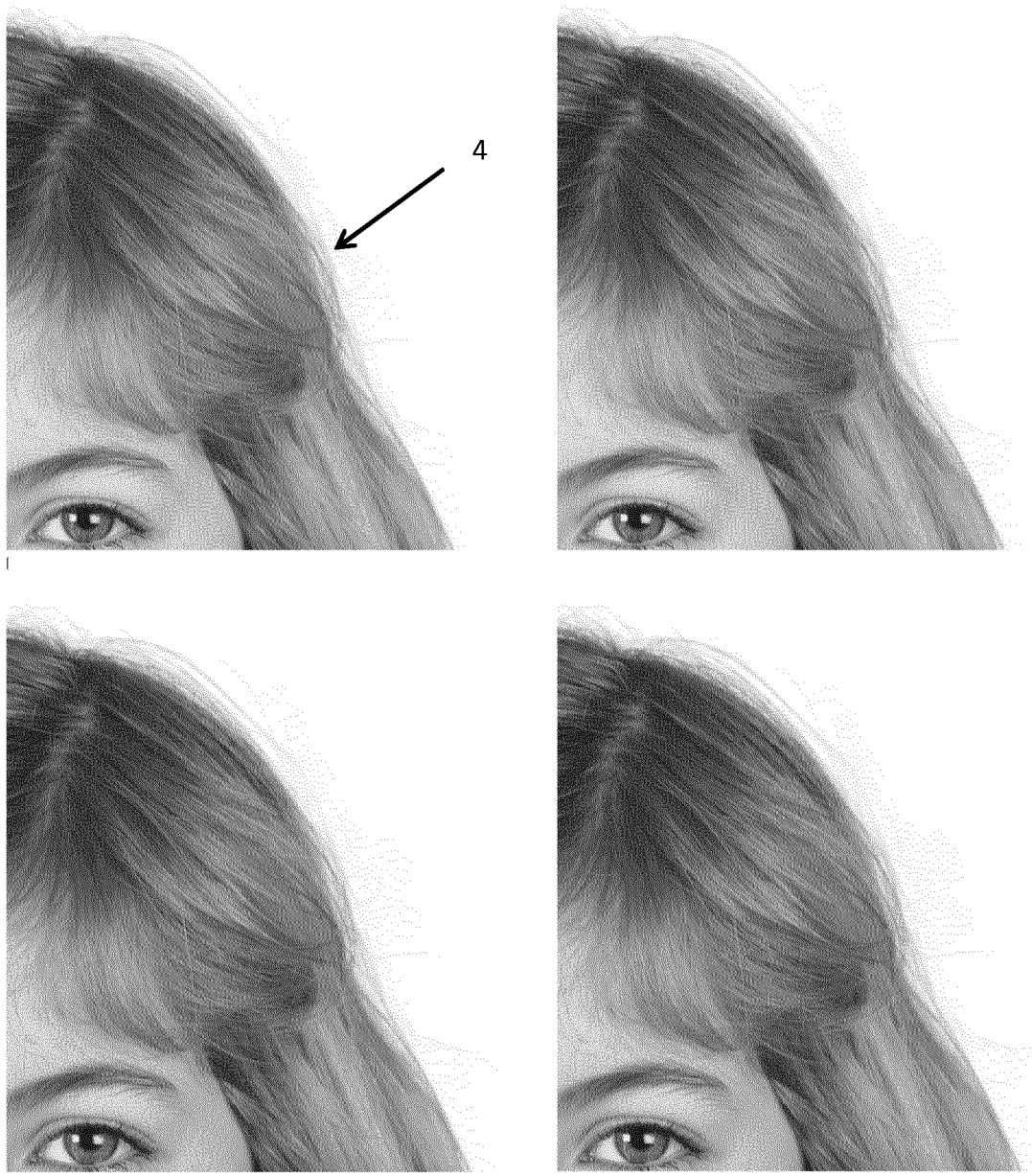

In FIG. 1b) the top right image is the color corrected image, in RGB color channels with an alpha channel overlaid. From this image it is very clear that the green spill in the subject's hair in the first region has been removed. This image may be a corrected image based on a corrected region of a corrected image. The corrected image may be based, at least in part, on one or more recoloring image(s). A first recoloring image may correspond to the red color channel of an RGB color image. A second recoloring image may correspond to the green color channel of an RGB color image. A third recoloring image may correspond to the blue color channel of an RGB color image.

In FIG. 1b) the bottom left image shows the original, not corrected image, in the green color channel only. From this image, the green spill from the background into the subject's hair in the first region can be seen, but it is less clear than in the top left image in RGB channels.

In FIG. 1b) the bottom right image is the color corrected image, in the green color channel only, i.e., this image may be based on a recoloring image. Since the color channel is the green channel, the image may be based on a second recoloring image corresponding to the green color channel of an RGB color image. From this image it can be seen that the green spill in the subject's hair in the first region has been removed, but it is less clear than in the top right image in RGB channels.

FIG. 2 schematically illustrates an example of color correction in an image. FIG. 2 shows how to change the color of an object in an image, in this case changing the color of a T-shirt worn by the subject in the image. This example clearly illustrates the method, also using black-white and grey scale images. In FIG. 2 the regions may be determined from user inputs, and may not require using any alpha masks at all. Alternatively, the regions may be determined by an automatic region identifier and/or by a combination of an automatic region identifier and user input.

In FIG. 2a) the top image shows the original, not corrected image, in RGB color channels. The subject's T-shirt is brown.

In FIG. 2a) the bottom image shows the regions which the image is divided into by a user. The first region, marked 1, is the region of the image where the colors should be corrected or changed. The second region, marked 2, is a region separate from, but surrounded by, the first region. The colors of the first region are to be determined using the method described herein. The colors in the second region will be replaced with the colors of the correction image. Hereby the whole T-shirt in the image will obtain the same color. The third region, marked 3, is the background of the image, in this case the screen in the photo studio, such as a white screen, where the colors are assumed to be correct in the image. The first region and second region in this image are an example of regions, where the second region is surrounded by the first region, and where the first and the second region are disjoint regions.

In FIG. 2b) the top image is the color corrected or color changed image in RGB color channels, where the color of the T-shirt has been changed to blue from the original brown color as seen in the top image in FIG. 2a). Thus this color corrected or color changed image may be based, at least in part, on one or more recoloring image(s). A first recoloring image may correspond to the red color channel of an RGB color image. A second recoloring image may correspond to the green color channel of an RGB color image. A third recoloring image may correspond to the blue color channel of an RGB color image.

In FIG. 2b) the bottom image is the original image in the red color channel only.

Figure 2C:
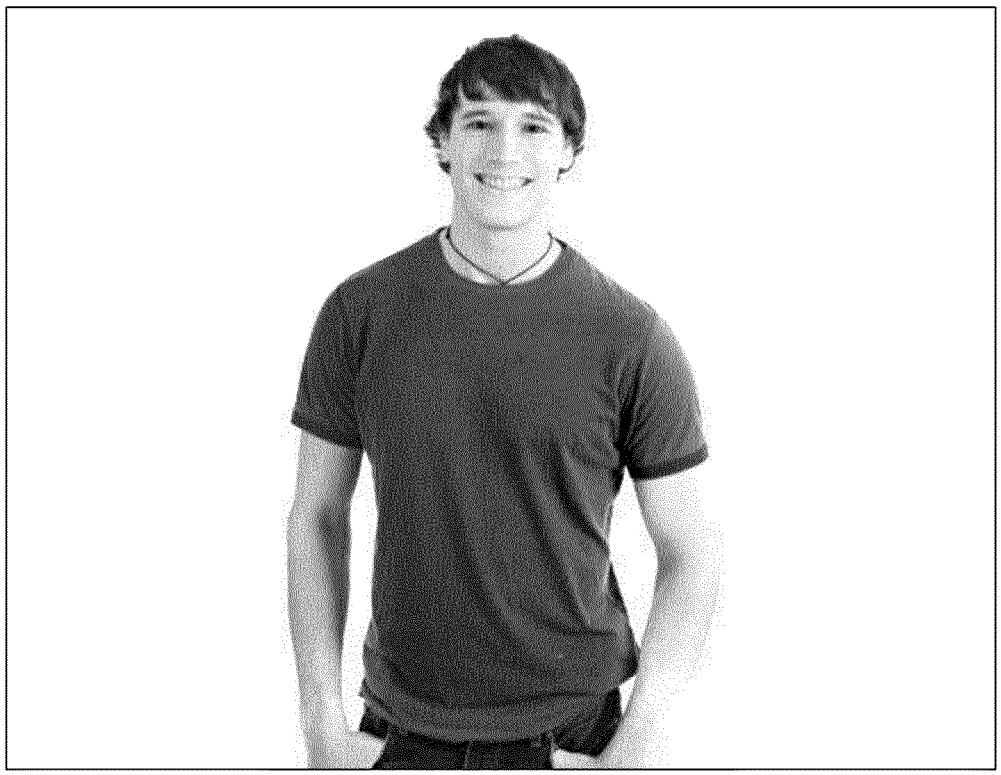
FIG. 2 schematically illustrates exemplary images illustrating the color correction or color change in an image obtained by the present method.

In FIG. 2c) the image is the color corrected image in the red color channel only. Thus the corrected image may be based, at least in part, on a recoloring image, in this case a first recoloring image corresponding to the red color channel of an RGB color image.

FIG. 3 to FIG. 8 show schematic flow charts illustrating the steps of the present method.

FIG. 3 schematically illustrates an example embodiment of the invention, where a basic image is obtained (101) and the Laplacian matrix of the image is determined (102). Next, the first region is obtained (103), a second region is obtained (104) and the first recoloring image is obtained (105). Finally, the first corrected image is obtained (106) and outputted (107).

Figure 4:
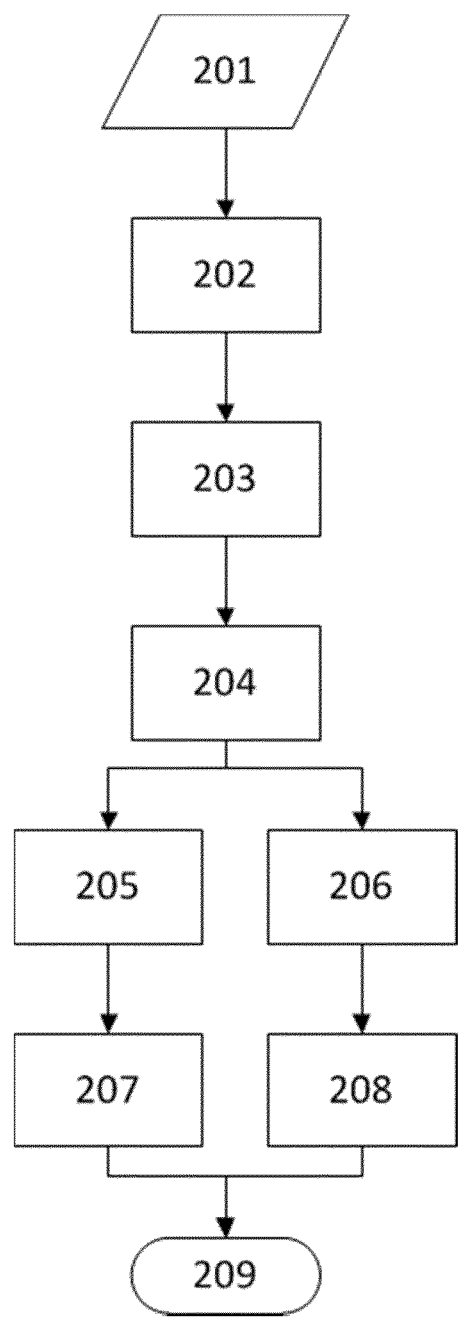
FIG. 4 schematically illustrates an exemplary flow chart illustrating steps of the present method.

FIG. 4 schematically illustrates an embodiment of the invention, where the image has two color channels. The steps 201-204 are similar to steps 101-104 in FIG. 3. Next, a first recoloring image is obtained (205) and a second recoloring image (206) is obtained. Based on the first recoloring image, a first corrected image is determined (207). Based on the second recoloring image, a second corrected image is determined (208). The final corrected image is outputted based on the first and the second corrected images (209).

Figure 5:
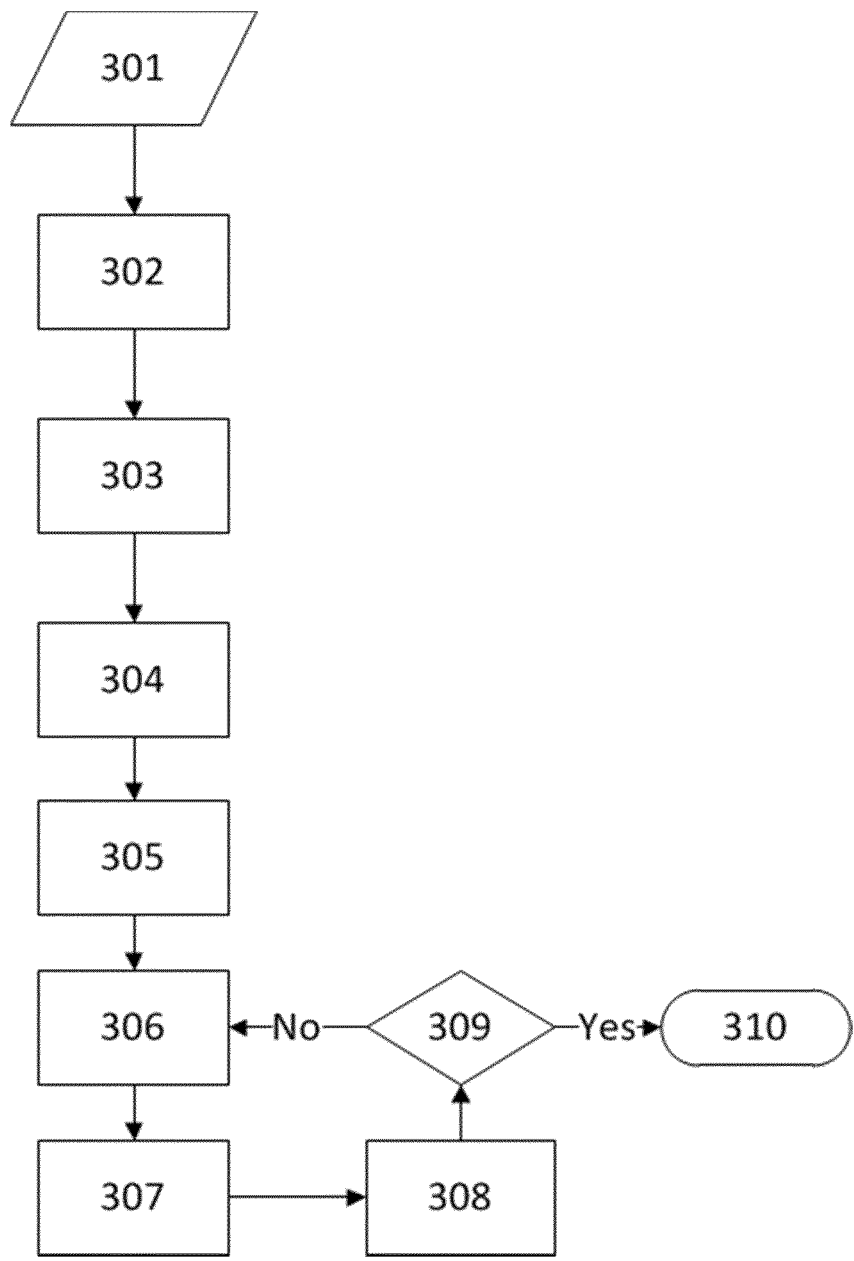
FIG. 5 schematically illustrates an exemplary flow chart illustrating steps of the present method.

FIG. 5 schematically illustrates an embodiment of the invention, where the basic image has an arbitrary number of color channels K. The steps 301-304 are similar to steps 101-104 in FIG. 3. First the integer k is set equal to 1 (305). The k'th recoloring image is obtained (306) and the k'th corrected image is determined (307) based on this. Next, k is incremented by one (308). If there are more color channels, i.e., the condition k>K (309) is not fulfilled, the steps 306-309 are repeated. If the condition k>K is fulfilled (309), the final corrected image is outputted based on all K corrected images.

FIG. 6 schematically illustrates an example of automatically obtaining a region from an image. First, the basic image is obtained (401). Next, an alpha mask for the image is obtained (402) before a region R is determined by numerical calculations based on the alpha mask (403). Finally, the region is obtained as R (404).

FIG. 7 schematically illustrates an example of obtaining a region from an image based on user input. First, the basic image is obtained (501) and displayed to the user (502). Next, the user specifies a region R using, e.g. a graphical user interface (503). Finally, the region is obtained as R (504).

Figure 8:
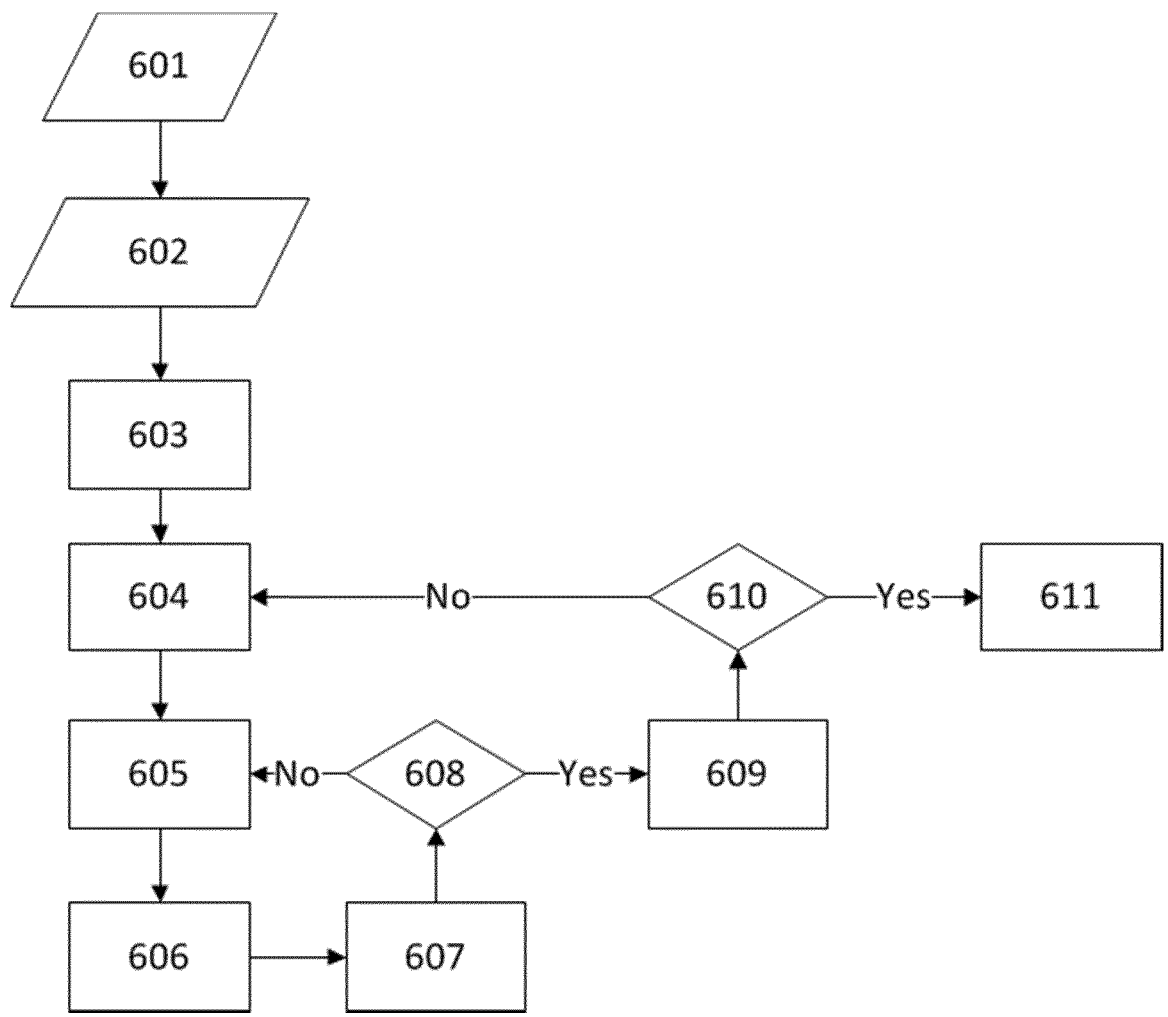
FIG. 8 schematically illustrates an exemplary flow chart illustrating steps of the present method.

FIG. 8 schematically illustrates an example of obtaining a Laplacian matrix for an image with N pixels. First the basic image with N pixels is obtained (601). Next, a distance or similarity function $d(x_i, x_j)$ between two pixels $x_i$ and $x_j$ is specified (602). The first counter i is set equal to 1 (603) and the second counter j is set equal to 1 (604). The function value $d(x_i, x_j)$ is calculated (605) and the (i,j)'th element of the adjacency matrix A is set equal to this value (606). Then j is incremented by one (607), and if the condition j>N (608) is not fulfilled the next step is 605. If the condition is fulfilled, the next step is to increment i by one (610). If the condition i>N (610) is not fulfilled, the next step is 604. If the condition is fulfilled, the Laplacian matrix is obtained from A (611).

Figure 9:
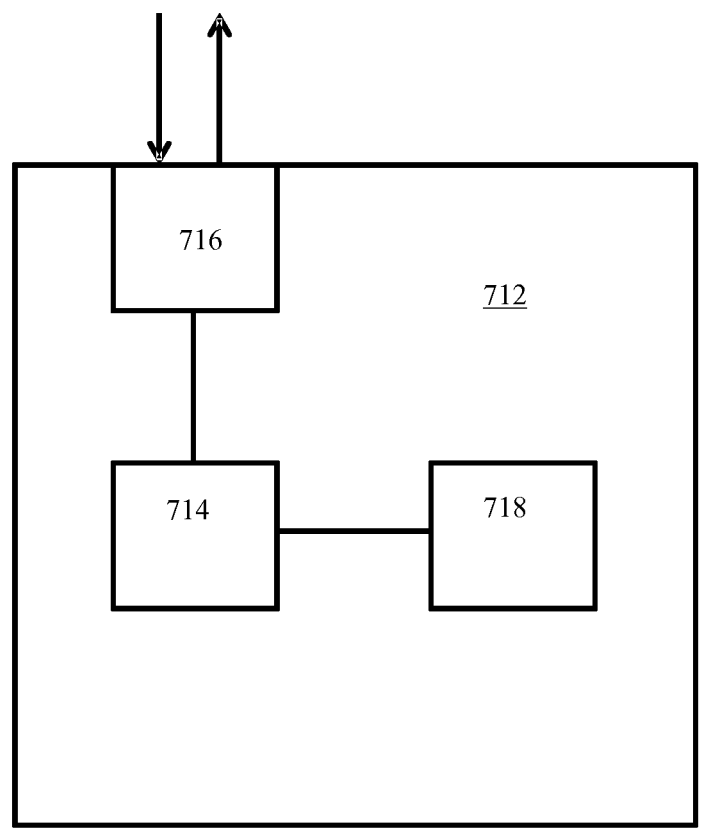
FIG. 9 schematically illustrates an example of an apparatus for color correction of an image.

FIG. 9 schematically illustrates an example of an apparatus for color correction of an image. The apparatus 712 comprises a processing device 714. The processing device is configured for obtaining an image. The processing device is configured for determining a Laplacian matrix of the image. The processing device is configured for obtaining a first region of the image, where the first region is indicative of a part of the image to be color corrected. The processing device is configured for obtaining a second region of the image. The processing device is configured for obtaining a first recoloring image based on the second region. The processing device is configured for determining a first corrected region of a first corrected image based on the Laplacian matrix and the first recoloring image. The processing device is configured for obtaining and/or outputting a corrected image based on the first corrected region of the first corrected image.

The apparatus 712 comprises an interface 716 configured for receiving and/or transmitting data, such as the image and/or the corrected image. The interface 716 is connected to the processing device 714. The interface 716 is configured for receiving and/or obtaining the image or basic image to be processed by the processing device 714. The interface 716 is configured for transmitting and/or outputting the corrected image which has been processed by the processing device 714.

The apparatus 712 comprises a memory unit 718. The memory unit is connected to the processing device 714. The memory unit 718 is configured for storing the processed data, such as the processed image, such as the corrected image, processed by the processing device 714.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 1 first region
2 second region
3 third region
4 miscolored, e.g. green, hair
101,201,301,401,501 obtaining a basic image
102,202,302 determining the Laplacian matrix of the image
103,203,303 obtaining a first region
104,204,304 obtaining a second region
105,205 obtaining a first recoloring image
106 obtaining a first corrected image
107 outputting the first corrected image.
206 obtaining a second recoloring image
207 determining a first corrected image based on the first recoloring image
208 determining a second corrected image based on the second recoloring image
209 outputting a final corrected image based on the first and the second corrected images
305 setting the first counter k equal to 1
306 obtaining a k'th recoloring image
307 determining a k'th corrected image
308 incrementing k by one
309 checking whether the condition k>K is fulfilled or not fulfilled, i.e., whether there are more color channels
402 obtaining an alpha mask for the image
403 determining a region R by numerical calculations based on the alpha mask
404 obtaining the region as R
502 displaying basic image to user
503 specification of a region R by user
504 obtaining the region as R
601 obtaining basic image with N pixels
602 specifying a distance or similarity function $d(x_i,x_j)$ between two pixels $x_i$ and $x_j$
603 setting the first counter i equal to 1
604 setting the second counter j equal to 1
605 calculating the function value $d(x_i,x_j)$
606 setting the (i,j)'th element of the adjacency matrix A equal to the value
607 incrementing j by one
608 checking if the condition j>N is fulfilled or not fulfilled
609 fulfilling condition 608
610 incrementing i by one, if condition 608 is fulfilled
611 obtaining the Laplacian matrix from A
712 apparatus
714 processing device
716 interface
718 memory unit

The invention claimed is:

1. A method comprising:
obtaining an image;
determining a Laplacian matrix of the image;
obtaining a first region of the image, the first region being indicative of a part of the image to be color corrected;
obtaining a second region of the image, wherein the second region corresponds to a background of the image;
obtaining a first recoloring image based on the second region by adjusting a color value of at least a portion of the background;
determining a first corrected region of a first corrected image based on the Laplacian matrix and the first recoloring image; and
obtaining and outputting a corrected image based on the first corrected region of the first corrected image.

2. The method of claim 1, further comprising:
obtaining a second recoloring image based on the second region; and
determining a second corrected image based on the Laplacian matrix and the second recoloring image.

3. The method of claim 1, further comprising:
obtaining a third recoloring image based on the second region; and
determining a third corrected image based on the Laplacian matrix and the third recoloring image.

4. The method of claim 1, wherein the corrected image is based on the first region.

5. The method of claim 1, wherein obtaining the first recoloring image based on the second region comprises adjusting a second recoloring region of the first recoloring image based on the second region.

6. The method of claim 5, wherein obtaining the first recoloring image based on the second region comprises obtaining one or more region parameters of the second recoloring region.

7. The method of claim 5, wherein obtaining the first recoloring image based on the second region comprises setting a color of the second recoloring region to a color different from a color of the second region of the image.

8. The method of claim 1, wherein determining the Laplacian matrix of the image comprises determining a matting Laplacian matrix of the image, the matting Laplacian matrix given by:

$$L_{ij} = \sum_{k|(i,j)\in w_k} \left( \delta_{ij} - \frac{1}{|w_k|} \left(1 + (I_i - \mu_k)^T \left(\sum_k + \frac{\varepsilon}{|w_k|} I_3\right)^{-1} (I_j - \mu_k)\right) \right)$$

where subscript ij refers to the ij'th element of the matting Laplacian matrix, $\delta_{ij}$ is the Kronecker delta, k is the k'th window with a total of $|w_k|$, $\Sigma_k$ is a covariance matrix, $\mu_k$ is a mean vector, $I_i$ is a vector of color channel values of the i'th pixel, $I_3$ is a 3×3 identity matrix, and $I_j$ is a vector of color channel values of the j'th pixel.

9. The method of claim 1, further comprising obtaining a third region of the image, wherein the first recoloring image is based on the third region.

10. The method of claim 9, wherein the first recoloring image comprises the third region of the image.

11. The method of claim 1, further comprising obtaining a mask representative of an alpha matte of the image, wherein the corrected image is based on the mask.

12. The method of claim 1, wherein adjusting the color value of at least the portion of the background comprises setting the color value of at least the portion of the background to a color value of a portion of the first region.

13. The method of claim 1, wherein the first region corresponds to a subject in a foreground of the image, and wherein adjusting the color value of at least the portion of the background comprises setting a color value of at least the portion of the background to a color value of the subject in the foreground of the image.

14. An apparatus comprising:
non-transitory memory; and
a processing device, where the processing device is to:
obtain an image;

determine a Laplacian matrix of the image;

obtain a first region of the image, the first region being indicative of a part of the image to be color corrected;

obtain a second region of the image, wherein the second region corresponds to a background of the image;

obtain a first recoloring image based on the second region by adjusting a color value of at least a portion of the background;

determine a first corrected region of a first corrected image based on the Laplacian matrix and the first recoloring image; and obtain and store, in the non-transitory memory, a corrected image based on the first corrected region of the first corrected image.

15. The apparatus of claim 14, wherein the processing device is further to:

obtain a second recoloring image based on the second region; and determine a second corrected image based on the Laplacian matrix and the second recoloring image.

16. The apparatus of claim 14, wherein the processing device is further to:

obtain a third recoloring image based on the second region; and determine a third corrected image based on the Laplacian matrix and the third recoloring image.

17. The apparatus of claim 14, wherein the processing device is to obtain the first recoloring image based on the second region by adjusting a second recoloring region of the first recoloring image based on the second region.

18. The apparatus of claim 17, wherein the processing device is to obtain the first recoloring image based on the second region by setting a color of the second recoloring region to a color different from a color of the second region of the image.

19. The method of claim 14, wherein the processing device is further to obtain a mask representative of an alpha matte of the image, wherein the corrected image is based on the mask.

20. A non-transitory computer-readable medium having instructions encoded thereon which, when executed by an apparatus including a processing device, cause the apparatus to:

obtain an image;

determine a Laplacian matrix of the image;

obtain a first region of the image, the first region being indicative of a part of the image to be color corrected;

obtain a second region of the image, wherein the second region corresponds to a background of the image;

obtain a first recoloring image based on the second region by adjusting a color value of at least a portion of the background;

determine a first corrected region of a first corrected image based on the Laplacian matrix and the first recoloring image; and obtain and store a corrected image based on the first corrected region of the first corrected image.

21. The non-transitory computer-readable medium of claim 20, wherein the instructions further cause the apparatus to:

obtain a second recoloring image based on the second region; and determine a second corrected image based on the Laplacian matrix and the second recoloring image.

22. The non-transitory computer-readable medium of claim 20, wherein the instructions further cause the apparatus to obtain a mask representative of an alpha matte of the image, wherein the corrected image is based on the mask.

* * * * *